(12) United States Patent
Xiao

(10) Patent No.: US 9,145,932 B2
(45) Date of Patent: Sep. 29, 2015

(54) RATCHET WHEEL FOR A TIGHTENER

(75) Inventor: Zhaoyin Xiao, Taizhou (CN)

(73) Assignee: Zhejiang Topsun Logistic Control Co., Ltd., Taizhou (CN)

( * ) Notice: Subject to any disclaimer, the term of this patent is extended or adjusted under 35 U.S.C. 154(b) by 543 days.

(21) Appl. No.: 13/391,293

(22) PCT Filed: Nov. 25, 2011

(86) PCT No.: PCT/CN2011/082978
§ 371 (c)(1),
(2), (4) Date: Feb. 20, 2012

(87) PCT Pub. No.: WO2013/029315
PCT Pub. Date: Mar. 7, 2013

(65) Prior Publication Data
US 2014/0008173 A1    Jan. 9, 2014

(30) Foreign Application Priority Data

Sep. 2, 2011   (CN) .......................... 2011 1 0258220

(51) Int. Cl.
  *B25B 25/00*    (2006.01)
  *F16D 41/00*    (2006.01)
  *A44B 11/12*    (2006.01)
  *B60P 7/08*    (2006.01)

(52) U.S. Cl.
  CPC .............. *F16D 41/00* (2013.01); *A44B 11/125* (2013.01); *B60P 7/083* (2013.01)

(58) Field of Classification Search
  CPC ............ B60P 7/083; B60P 7/08; F16H 55/12; F16H 55/18; Y10T 24/2175; F16D 41/00; Y10S 24/909; B25B 25/00; A44B 11/125

USPC ........... 74/445, 449, 439, 575, 530, 540, 541, 74/533–538, 502.2, 505–507; 24/68 CD; 254/217, 218, 214, 223; 410/100; 242/389, 396.4, 395, 396.2
See application file for complete search history.

(56) References Cited

U.S. PATENT DOCUMENTS

| | | | | |
|---|---|---|---|---|
| 1,862,867 | A * | 6/1932 | Strauss | 74/445 |
| 3,719,103 | A * | 3/1973 | Streander | 74/445 |
| 5,156,506 | A * | 10/1992 | Bailey | 24/68 CD |
| 6,648,301 | B2 * | 11/2003 | Lee | 254/218 |
| 7,392,723 | B2 * | 7/2008 | Tsumiyama | 74/502.2 |

(Continued)

FOREIGN PATENT DOCUMENTS

| | | |
|---|---|---|
| CN | 2803637 Y | 8/2006 |
| CN | 2894891 Y | 5/2007 |

(Continued)

*Primary Examiner* — Daniel Yabut
(74) *Attorney, Agent, or Firm* — Minder Law Group; Willy H. Wong

(57) ABSTRACT

A ratchet wheel for a tightener in the field of mechanics, which addresses the problems existing in conventional tighteners where the ratchet wheel tends to be shifted to offset or dislocate the reel. The ratchet wheel for the tightener includes a wheel body which is of a round-disk shape and has several ratchets along the edge thereof. Axial holes are set at the wheel body to pass the reel. Connecting parts are disposed at the ends of the axial holes to protrude vertically from the end face of the ratchet wheel. The connecting parts could be embedded onto the handle or support of the tightener. The ratchet wheel for the tightener is equipped with the advantages such as firm connection and high reliability.

6 Claims, 7 Drawing Sheets

(56) References Cited

U.S. PATENT DOCUMENTS

| | | | |
|---|---|---|---|
| 7,392,973 B1 * | 7/2008 | Hsieh | 254/218 |
| 7,464,915 B2 * | 12/2008 | Liu et al. | 254/217 |
| 2003/0146424 A1 * | 8/2003 | Lee | 254/223 |
| 2008/0273937 A1 * | 11/2008 | Hanson | 24/68 CD |
| 2010/0295004 A1 * | 11/2010 | Huang | 24/68 R |
| 2011/0001627 A1 * | 1/2011 | Ruan | 24/68 CD |

FOREIGN PATENT DOCUMENTS

| | | | |
|---|---|---|---|
| DE | 102007023855 A1 | * | 12/2008 |
| FR | 2915856 A3 | * | 11/2008 |

* cited by examiner

RATCHET WHEEL FOR A TIGHTENER

RELATED APPLICATION

This application is a national stage entry of International Application No. PCT/CN2011/082978, filed Nov. 25, 2011, and claims benefit of Chinese Patent Application No. CN201110258220.0, filed Sep. 2, 2011. The present invention is related to patent application Ser. No. 13/384,243 entitled "A Quick Tightener". The above applications are incorporated by reference herein.

BACKGROUND OF THE INVENTION

1. Field of Invention

The present invention relates to a tightener for binding cargoes, in particular, to a ratchet wheel for a tightener, in the field of mechanics.

2. Related Art

Generally speaking, cargoes are required to be bound together while being transported by vehicles. It is lowly effective and laboursome to bind the cargoes by using nylon ropes or wire ropes. Meanwhile, the cargoes are difficult to be bound tightly. The Cargoes could be rapidly and conveniently bound and positioned by means of the tighteners. As a result, the tighteners are now widely applied.

The conventional tightener is composed of a body, a ratchet wheel, a baffle, a spring, a grip, a reel, a lateral plate, a mesh belt, a belt hook and so on. The ratchet wheel rotates in a single direction by turning the lateral plate, and then the mesh belt wrapped on the reel is continually frapped, so that two belt hooks are tightened on the cargoes or vehicle body.

In the conventional tightener, the reel consists of two half-moon keys of a semi-circular shape in section. Both ends of said two half-moon keys pass through the ratchet wheel respectively, and are fixed to each other by pins.

A large binding force is required when heavy cargoes are carried by vehicles, which is a challenge on the mechanical strength of the tightener. In fact, if the belts are frapped with an overlarge force when the cargoes are bound, the tightener would tend to be damaged.

In such a scenario, the ratchet wheel would be shifted from its original position, in which case the reel would be shifted accordingly. Consequently, the reel would be unevenly stressed, and the reel might be disengaged from the tightener in serious cases.

Similar drawbacks also occur in other conventional tighteners.

SUMMARY OF THE INVENTION

In order to address the aforementioned problems existing in the prior art, one object of the invention is to provide a ratchet wheel for a tightener which has a simple configuration, low cost and relatively high reliability.

The present invention provides a ratchet wheel for a tightener, comprising a wheel body which is of a round-disk shape and has several ratchets along the edge thereof. Axial holes are set at the wheel body to pass the reel. Connecting parts are disposed at the ends of the axial holes to protrude vertically from the end face of the ratchet wheel. The connecting part could be embedded onto the handle or support of the tightener.

In the quick tightener having the ratchet wheel of the invention, the ratchet wheel could be reliably connected to the handle or support by means of the connecting parts. The ratchet wheel could only rotate and would not be displaced along the direction vertical to the reel in use.

According to one embodiment of said ratchet wheel for a tightener, there are two said axial holes including a first axial hole and a second axial hole. The connecting parts are disposed at the ends of both the first axial hole and the second axial hole.

Obviously, at least two connecting parts could be used to reliably connect the ratchet wheel to the handle or support.

According to another embodiment of said ratchet wheel for a tightener, the wheel body includes a first wheel body and a second wheel body, in which the first wheel body is fixedly connected with the second wheel body.

According to another embodiment of said ratchet wheel for a tightener, a positioning protrusion is set on said first wheel body and a positioning recess is set on the second wheel body which is matched with the positioning protrusion. Said positioning protrusion could be embedded within said positioning recess.

According to another embodiment of said ratchet wheel for a tightener, a positioning protrusion is set on said second wheel body and a positioning recess is set on the first wheel body which is matched with the positioning protrusion. Said positioning protrusion could be embedded within said positioning recess.

According to another embodiment of said ratchet wheel for a tightener, the inner side of the first wheel body is coupled to that of the second wheel body, and the outer sides of the first wheel body and second wheel body are provided with projecting connecting parts.

The sides of the first wheel body and second wheel body facing to each other, i.e. the inner sides thereof, are fixed to each other by a connection mechanism. The sides of the first wheel body and second wheel body opposite to each other, i.e. the outer sides thereof, are provided with connecting parts. In such a configuration, the first wheel body could be firmly fixed to the second wheel body. Meanwhile, the first wheel body could be reliably connected to the support and the second wheel body could be reliably connected to the handle.

According to another embodiment of said ratchet wheel for a tightener, the first wheel body is fixedly connected with the second wheel body by welding.

According to another embodiment of said ratchet wheel for a tightener, the first wheel body is fixedly connected with the second wheel body by means of a fastener. The fastener could be implemented with rivets, screws and so on.

According to another embodiment of said ratchet wheel for a tightener, the first and second wheel bodies are formed by stamping.

The first and second wheel bodies could be stamped in such a manner that the first through hole, second through hole, connecting parts, positioning protrusion and positioning recess could be formed one time.

According to another embodiment of said ratchet wheel for a tightener, the connecting part of said ratchet wheel in a circular-disk shape is projected at the end of the ratchet wheel, and the first axial hole and second axial hole extend through the connecting part.

Therefore, the contact area between the connecting part and the support or handle is enlarged, thereby further improving the reliability of the ratchet wheel.

According to another embodiment of said ratchet wheel for a tightener, the ratchet wheel is a one-piece unit and projecting connecting parts are provided at both sides of the ratchet wheel.

According to one further embodiment of said ratchet wheel for a tightener, the ratchet wheel is formed by casting. It is evident that the ratchet wheel could be formed by casting one time as such.

Compared with the prior art, the ratchet wheel for the tightener of the invention could be formed by stamping. As a result, the ratchet wheel is formed by processing one time, the manufacturing method for which is simple and the manufacturing cost for which is low.

In the meantime, the first wheel body could be firmly connected to the second wheel body by means of the connection mechanism. The connecting parts of the first wheel body are stably connected to the support and the connecting parts of the second wheel body are stably connected to the handle. Consequently, the ratchet wheel is firmly connected to the handle or support.

Moreover, the connecting parts of the ratchet wheel are connected with the support or handle in such a manner that the quick tightener having the said ratchet wheel could be easily assembled in a high efficiency.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

First Embodiment

Figure 1:
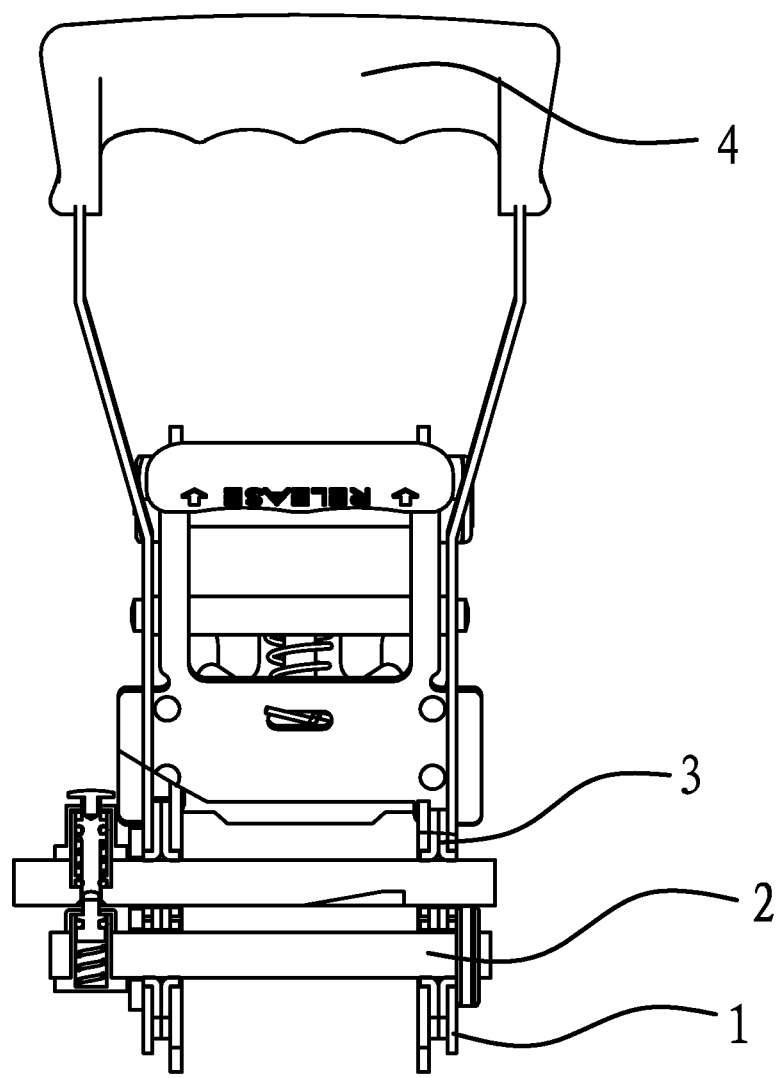
FIG. 1 is a schematic diagram of a quick tightener having the ratchet wheel of the invention.
Figure 2:
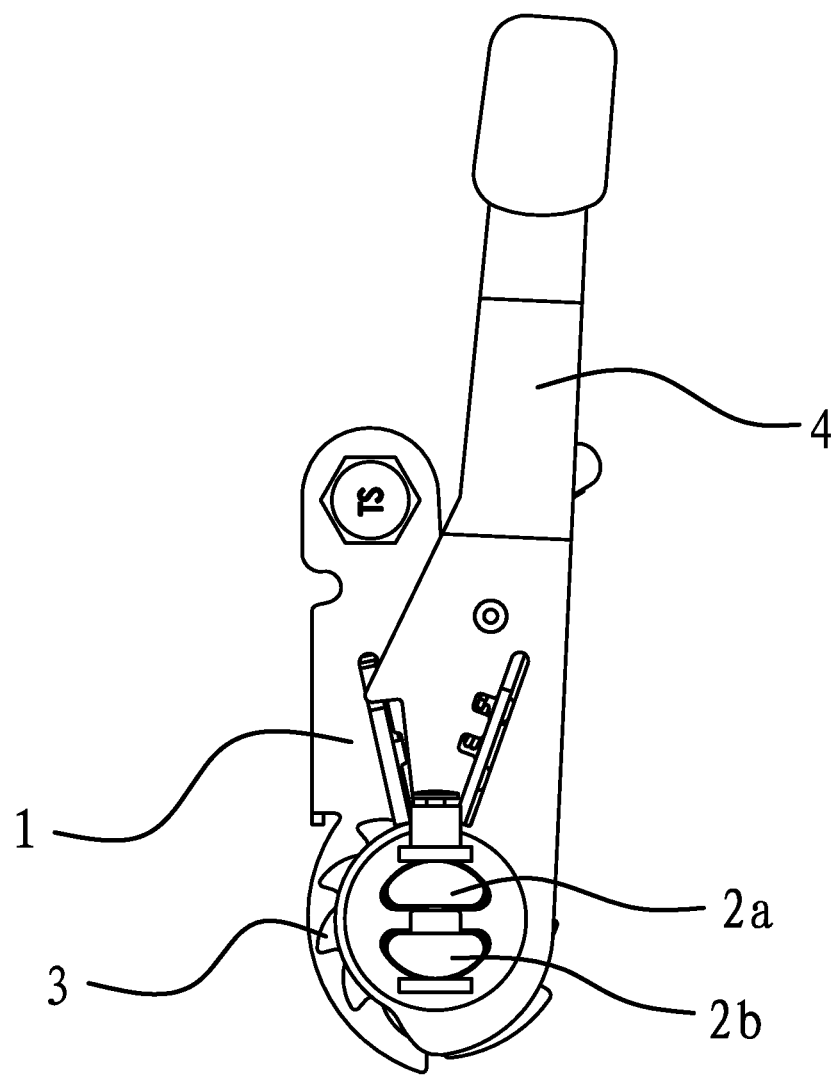
FIG. 2 is a side view of the tightener of FIG. 1.

As shown in FIGS. 1 and 2, a quick tightener includes a support 1, a reel 2, a ratchet wheel 3, a handle 4 and a binding belt. The reel 2 is connected with the ratchet wheel 3 and the reel 2 is located on the support 1. The handle 4 is hinged to the support 1 by the reel. The ratchet wheel 3 could be driven by the handle 4 to rotate. The binding belt is connected to the reel 2.

Figure 3:
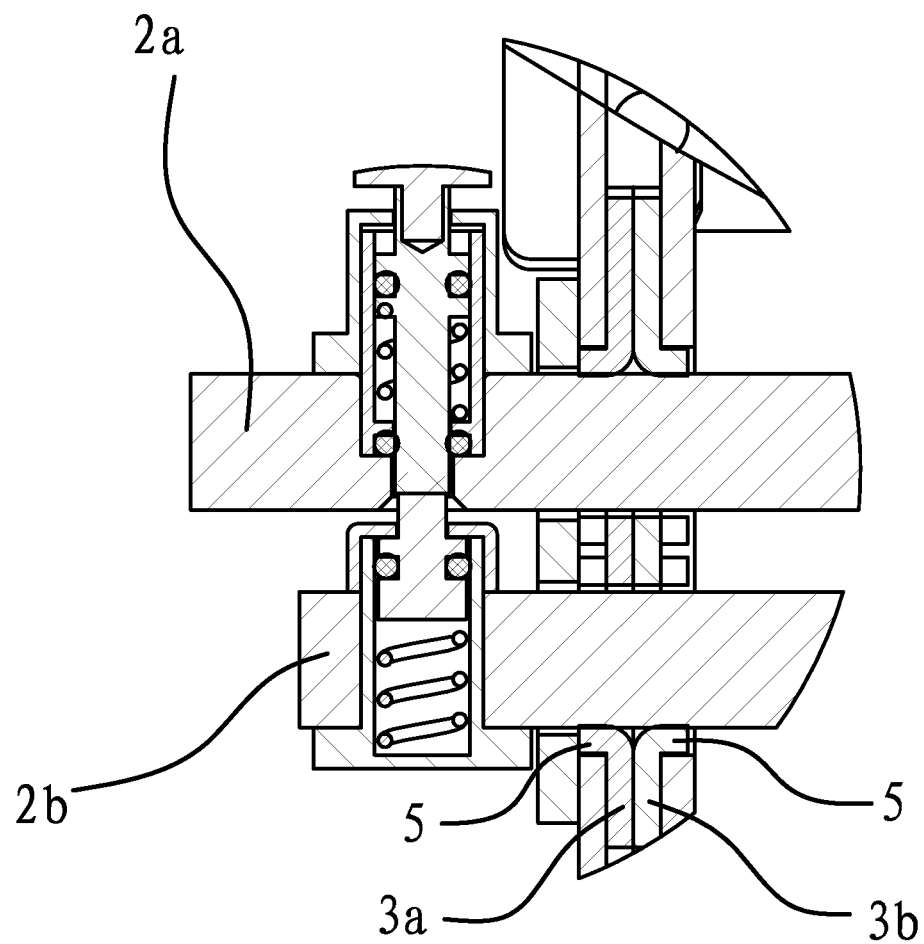
FIG. 3 is a sectional structural diagram taken at the ratchet wheel in the quick tightener.

As shown in FIG. 3, the quick tightener comprises a second half-moon shaft 2b and a first half-moon shaft 2a located on the support 1. Both the second half-moon shaft 2b and the first half-moon shaft 2a are connected to the ratchet wheel 3 of the tightener, and have a spacing therebetween to connect the binding belt.

The second half-moon shaft 2b is fixedly connected with the ratchet wheel 3. The first half-moon shaft 2a is circumferentially fixedly connected with the ratchet wheel. The second half-moon shaft 2b could move relative to the ratchet wheel in the axial direction. A clutch means is provided between the second half-moon shaft 2b and the first half-moon shaft 2a to engage the first half-moon shaft with the second half-moon shaft or disengage the first half-moon shaft from the second half-moon shaft.

Figure 4:
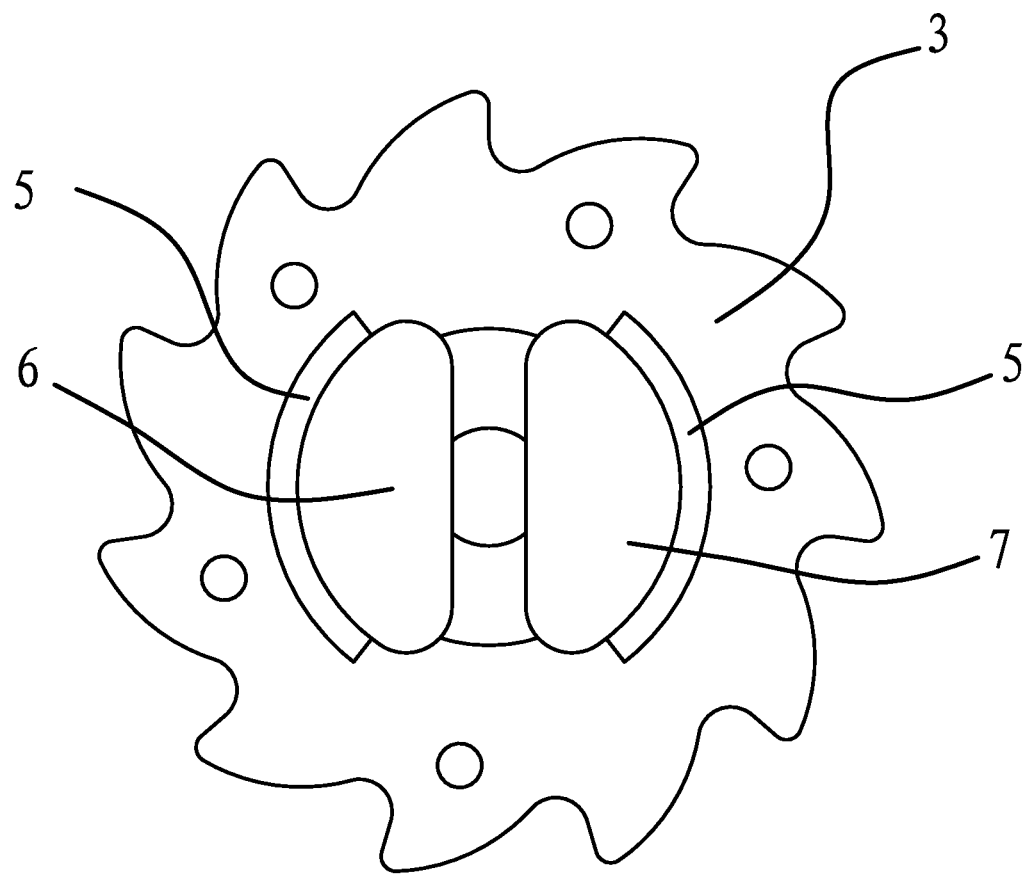
FIG. 4 is a structural diagram of the ratchet wheel of the tightener of the invention.
Figure 5:
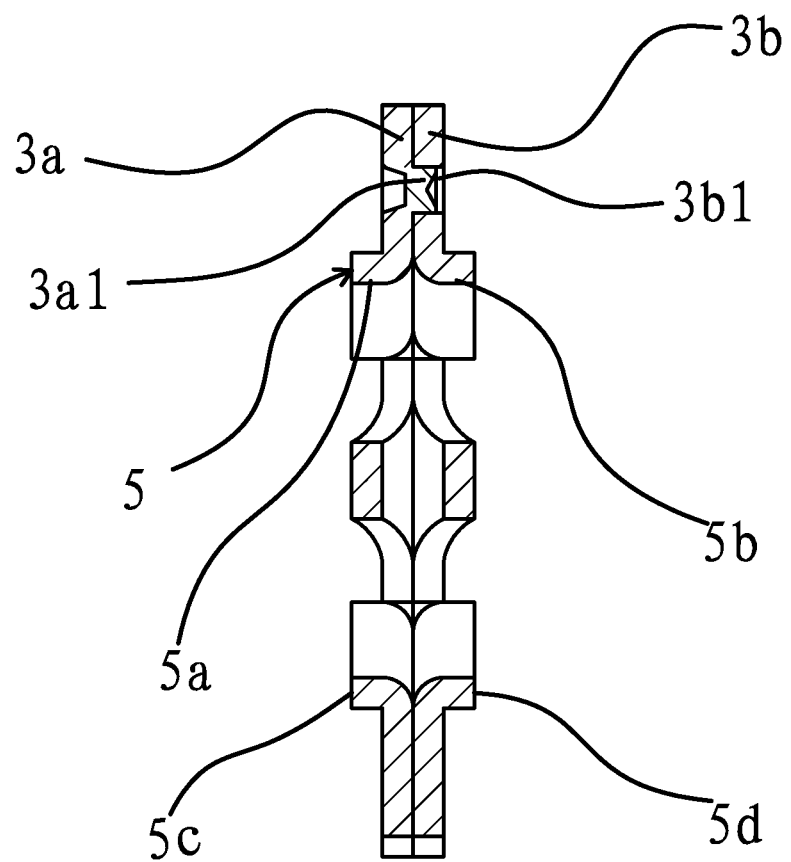
FIG. 5 is a sectional structural diagram of the ratchet wheel of the tightener of the invention.

Referring to FIGS. 4 and 5, the ratchet wheel 3 has a wheel body which is of a round-disk shape and has several ratchets along the edge thereof. Axial holes are set at the wheel body to pass the reel 2. Connecting parts 5 are disposed at the ends of the axial holes to protrude vertically from the end face of the ratchet wheel 3. The connecting parts 5 could be embedded onto the handle 4 or support 1 of the tightener.

For example, there are two axial holes including a first axial hole and a second axial hole 7. Connecting parts 5 are disposed at the ends of both the first axial hole 6 and the second axial hole 7.

The ratchet wheel 3 is composed of a first wheel body 3a and a second wheel body 3b. The first wheel body 3a is fixedly connected with the second wheel body 3b via a connection mechanism. The connection mechanism is implemented by a positioning protrusion 3a1 on the first wheel body 3a and a positioning recess 3b1 at the second wheel body 3b which is matched with the positioning protrusion 3a1. The positioning protrusion 3a1 is embedded within the positioning recess 3b1. The inner side of the first wheel body 3a is coupled to that of the second wheel body 3b. The outer sides of the first wheel body 3a and second wheel body 3b are provided with projecting connecting parts 5. In this embodiment, the first wheel body 3a and the second wheel body 3b are formed by stamping.

The connection mechanism could be implemented with an alternative approach in practice, in which a positioning protrusion is set on the second wheel body and a positioning recess is set on the first wheel body which is matched with the positioning protrusion. The positioning protrusion is embedded within the positioning recess.

The other parts of the tightener of the present invention are identical to those of the conventional binders except the improvement to the ratchet wheel 3. Both sides of the ratchet wheel 3 have connecting parts 5 which are connected to the support 1 and the handle 4 respectively. The anti-shift property of the ratchet wheel 3 is improved. As such, the second half-moon shaft 2b could move rapidly and smoothly and would not get stuck. In the quick tightener having the ratchet wheel 3, the ratchet wheel 3 could be reliably connected to the handle 4 or support 1 through the connecting parts. The ratchet wheel 3 could only rotate and would not be displaced along the direction vertical to the reel 2 during use.

Second Embodiment

Figure 6:
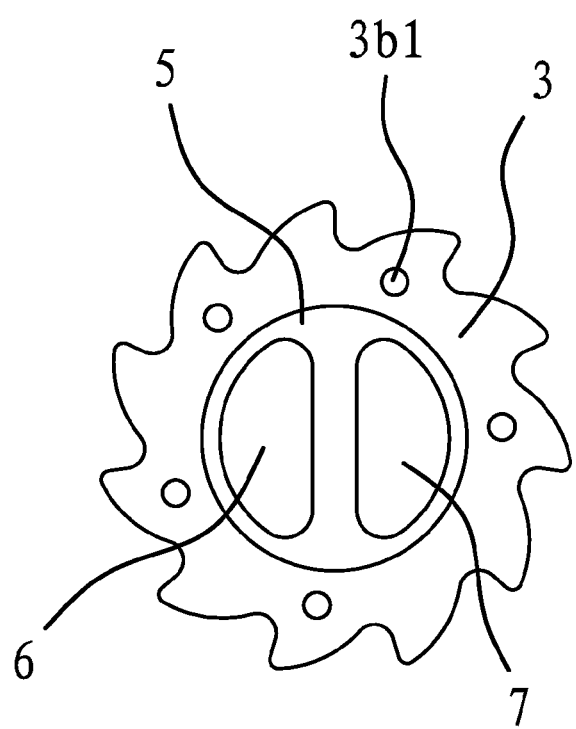
FIG. 6 is a structural diagram of the ratchet wheel of the tightener in the second embodiment of the invention.
Figure 7:
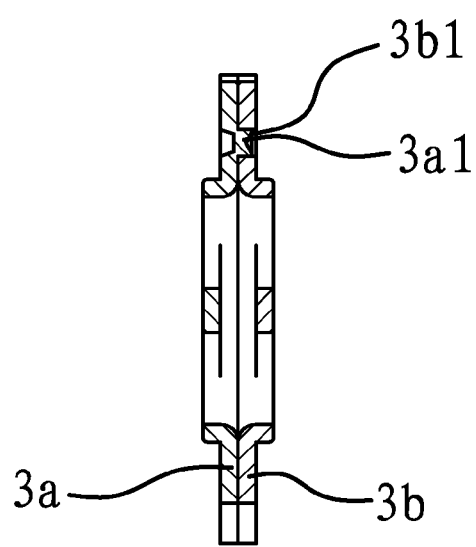
FIG. 7 is a sectional structural diagram of the ratchet wheel of FIG. 6.

The second embodiment has the configuration and principle substantially identical to those of the first embodiment except that the connecting part 5 of the ratchet wheel 3 in a circular-disk shape is projected at the end of the ratchet wheel 3 and the first axial hole 6 and second axial hole 7 extend through the connecting part 5, with reference to FIGS. 6 and 7. Such a configuration would enlarge the contact area between the connecting part 5 and the support 1 or handle 4.

Third Embodiment

Figure 8:
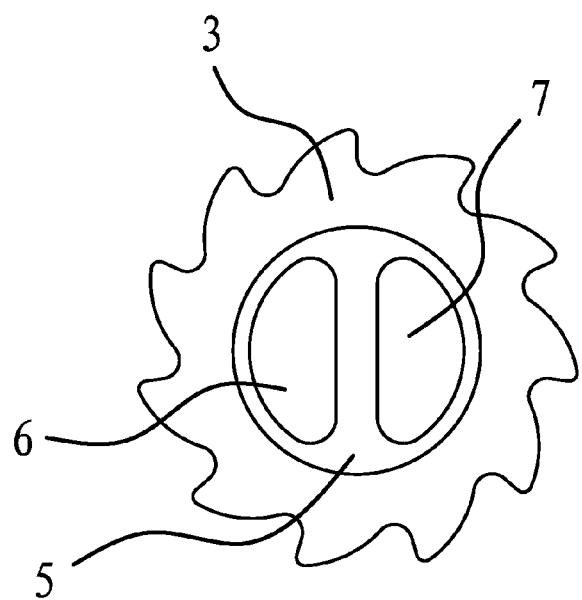
FIG. 8 is a structural diagram of the ratchet wheel of the tightener in the third embodiment of the invention.
Figure 9:
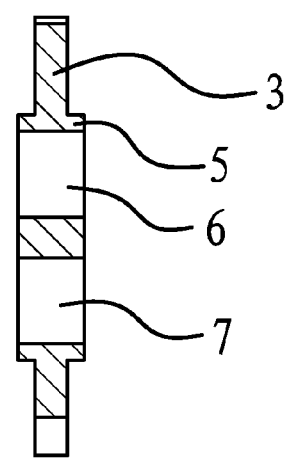
FIG. 9 is a sectional structural diagram of the ratchet wheel of FIG. 8.

The third embodiment has the configuration and principle substantially identical to those of the first embodiment except that the ratchet wheel 3 is a one-piece unit, projecting connecting parts 5 are provided at both sides of the ratchet wheel 3, and the ratchet wheel 3 is formed by casting, as shown in FIGS. 8 and 9.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Although these terms are used herein, such as support 1, reel 2 and ratchet wheel 3, the other similar terms could also be used. These terms are merely used to describe and explain the essence of the invention more conveniently, and any limitation to said terms is regarded as departing from the spirit of the invention.

LIST OF REFERENCE NUMERALS

1 support
2 reel
2*a* first half-moon shaft
2*b* second half-moon shaft
3 ratchet wheel
3*a* first wheel body
3*a*1 positioning protrusion
3*b* second wheel body
3*b*1 positioning recess
4 handle
5 connecting part
5*a* first handle connecting part
5*b* first support connecting part
5*c* second handle connecting part
5*d* second support connecting part
6 first axial hole
7 second axial hole

What is claimed is:

1. A ratchet wheel for a tightener, located between a support (1) and a handle (4) of the tightener, comprising:
    a wheel body (3) having an edge, the wheel body (3) comprising a first wheel body (3*a*) and a second wheel body (3*b*), the first wheel body (3*a*) fixedly connected to the second wheel body (3*b*), the first wheel body (3*a*) and the second wheel body (3*b*) being stamped parts;
    a plurality of ratchets along the edge;
    a plurality of axial holes in the wheel body (3), including a first axial hole (6) and a second axial hole (7);
    a reel (2) passing through at least one of the axial holes;
    an inner side of the first wheel body (3*a*);
    an inner side of the second wheel body (3*b*), the inner side of the first wheel body (3*a*) coupled to the inner side of the second wheel body (3*b*) by a positioning protrusion (3*a*1) of the first wheel body (3*a*), the positioning protrusion (3*a*1) embedded within a corresponding positioning recess (3*b*1) of the second wheel body (3*b*) that matches with the positioning protrusion (3*a*1);
    an outer side of the first wheel body (3*a*);
    an outer side of the second wheel body (3*b*); and
    a plurality of connecting parts (5) protruding generally perpendicular from the outer side of the first wheel body (3*a*) and from the outer side of the second wheel body (3*b*), the plurality of connecting parts (5) includes a first handle connecting part (5*a*) on the first wheel body (3*a*) and a first support connecting part (5*b*) on the second wheel body (3*b*), the first handle connecting part (5*a*) and the first support connecting part (5*b*) disposed at opposite ends of the first axial hole (6);
    wherein the first handle connecting part (5*a*) is engaged with the handle (4) and the first support connecting part (5*b*) is engaged with the support (1).

2. The ratchet wheel for a tightener as claimed in claim 1, further comprising:
    a second handle connecting part (5*c*) on the first wheel body (3*a*); and
    a second support connecting part (5*d*) on the second wheel body (3*b*), the second handle connecting part (5*c*) and the second support connecting part (5*d*) disposed at opposite ends of the second axial hole (7);
    wherein the second handle connecting part (5*c*) is engaged with the handle (4) and the second support connecting part (5*d*) is engaged with the support (1).

3. The ratchet wheel for a tightener as claimed in claim 1, wherein the first wheel body (3*a*) and the first handle connecting part (5*a*) is a single structure.

4. The ratchet wheel for a tightener as claimed in claim 3, wherein the second wheel body (3*b*) and the first support connecting part (5*b*) is a single structure.

5. The ratchet wheel for a tightener as claimed in claim 2, wherein the first wheel body (3*a*) and the first handle connecting part (5*a*) is a single structure.

6. The ratchet wheel for a tightener as claimed in claim 5, wherein the second wheel body (3*b*) and the first support connecting part (5*b*) is a single structure.

* * * * *